(12) United States Patent
Ning et al.

(10) Patent No.: US 12,403,603 B2
(45) Date of Patent: Sep. 2, 2025

(54) CONTROL DEVICE AND CONTROL METHOD

(71) Applicant: OMRON Corporation, Kyoto (JP)

(72) Inventors: Xiaoguang Ning, Kyoto (JP); Shigeki Sugano, Tokyo (JP); Tomohiro Wada, Tokyo (JP); Yoshihiro Sakamoto, Tokyo (JP)

(73) Assignee: OMRON Corporation, Kyoto (JP)

( * ) Notice: Subject to any disclaimer, the term of this patent is extended or adjusted under 35 U.S.C. 154(b) by 115 days.

(21) Appl. No.: 18/015,539

(22) PCT Filed: Mar. 5, 2021

(86) PCT No.: PCT/JP2021/008768
§ 371 (c)(1),
(2) Date: Jan. 11, 2023

(87) PCT Pub. No.: WO2022/044389
PCT Pub. Date: Mar. 3, 2022

(65) Prior Publication Data
US 2023/0256605 A1    Aug. 17, 2023

(30) Foreign Application Priority Data
Aug. 27, 2020   (JP) .................................. 2020-143876

(51) Int. Cl.
*B25J 9/16*       (2006.01)
*G05B 19/4155*    (2006.01)

(52) U.S. Cl.
CPC .......... *B25J 9/1676* (2013.01); *B25J 9/1651* (2013.01); *G05B 19/4155* (2013.01); *G05B 2219/50391* (2013.01)

(58) Field of Classification Search
CPC ... B25J 9/1676; B25J 9/1651; G05B 19/4155; G05B 2219/50391
See application file for complete search history.

(56) References Cited

U.S. PATENT DOCUMENTS

| 2016/0011588 A1* | 1/2016 | Takahashi | B25J 9/1674 700/112 |
| 2016/0016315 A1* | 1/2016 | Kuffner, Jr. | B25J 19/06 901/49 |

(Continued)

FOREIGN PATENT DOCUMENTS

| DE | 102017005604 | 12/2018 |
| JP | H0624700 | 2/1994 |

(Continued)

OTHER PUBLICATIONS

"Search Report of Europe Counterpart Application", issued on Jul. 30, 2024, p. 1-p. 9.

(Continued)

*Primary Examiner* — Thomas E Worden
*Assistant Examiner* — Jay Khandpur
(74) *Attorney, Agent, or Firm* — JCIPRNET

(57) ABSTRACT

In the present invention, contact between an operator and a robot that moves a workpiece is avoided, and an effect on an article is reduced. This robot controller (1), which controls the operation speed of a robot (2) that moves a workpiece (3), comprises: a prediction unit (11) that predicts contact from the position of a robot and the position of a person or object; and an acceleration change unit (12) that, when contact is predicted by the prediction unit, changes the acceleration at which the speed of the robot is reduced to perform an emergency stop in accordance with the presence of the workpiece.

8 Claims, 7 Drawing Sheets

(56) References Cited

U.S. PATENT DOCUMENTS

| | | | |
|---|---|---|---|
| 2017/0014999 A1* | 1/2017 | Inoue | B25J 9/1651 |
| 2017/0100838 A1* | 4/2017 | Lewis | B25J 9/1676 |
| 2017/0326734 A1 | 11/2017 | Iida et al. | |
| 2019/0105775 A1 | 4/2019 | Oyama et al. | |
| 2020/0206928 A1* | 7/2020 | Denenberg | G01S 17/04 |

FOREIGN PATENT DOCUMENTS

| | | |
|---|---|---|
| JP | 2009107622 | 5/2009 |
| JP | 2015000470 A * | 1/2015 |
| JP | 2019098410 | 6/2019 |
| KR | 20150080050 | 7/2015 |
| WO | 9113388 | 9/1991 |
| WO | 9737138 | 10/1997 |
| WO | 2011033583 | 3/2011 |
| WO | 2013001658 | 1/2013 |

OTHER PUBLICATIONS

"International Search Report (Form PCT/ISA/210) of PCT/JP2021/008768", mailed on Apr. 20, 2021, with English translation thereof, pp. 1-4.

"Written Opinion of the International Searching Authority (Form PCT/ISA/237) of PCT/JP2021/008768", mailed on Apr. 20, 2021, with English translation thereof, pp. 1-8.

"Office Action of China Counterpart Application", with English translation thereof, issued on Dec. 16, 2024, pp. 1-15.

"Office Action of China Counterpart Application", issued on Jun. 30, 2025, with English translation thereof, p. 1-p. 14.

\* cited by examiner

CONTROL DEVICE AND CONTROL METHOD

CROSS-REFERENCE TO RELATED APPLICATION

This application is a 371 application of the International PCT application serial no. PCT/JP2021/008768, filed on Mar. 5, 2021, which claims the priority benefits of Japan Patent Application No. 2020-143876, filed on Aug. 27, 2020. The entirety of each of the above-mentioned patent applications is hereby incorporated by reference herein and made a part of this specification.

TECHNICAL FIELD

The present invention relates to a control device for a robot.

RELATED ART

A robot device is known by which an operator works in cooperation with a robot. In order to ensure the safety of the operator, it is common for the robot to stop immediately when a laser scanner or the like detects that the operator has entered the working range of the robot.

If the robot immediately stops frequently, it may excessively impair the productivity, so there is a need for the operator and the robot to cooperate within a range where they do not come into contact with each other. Patent Literature 1 discloses a technique for controlling the operation speed to be equal to or less than a speed limit according to the shortest distance between the robot and surrounding objects.

CITATION LIST

Patent Literature

[Patent Literature 1] Japanese Patent Laid-Open No. 2019-098410

SUMMARY OF INVENTION

Technical Problem

However, the related art as described above does not take into consideration the article (workpiece) held by the robot. Since the robot suddenly brakes during the emergency stop to avoid contact with the operator, the inertial force may apply an excessive force to the article held by the robot or contents thereof, resulting in damage to the article.

One aspect of the present invention is to avoid contact between a robot that moves an article and an operator and to reduce the influence on the article.

Solution to Problem

A control device according to one aspect of the present invention is a control device for controlling an operation speed of a robot that moves an article. The control device includes: a prediction unit predicting contact from a position of the robot and a position of a person or an object; and an acceleration change unit changing an acceleration of a deceleration of the robot for performing an emergency stop according to whether the article is present, when contact is predicted by the prediction unit.

A control method according to one aspect of the present invention is a control method for controlling an operation speed of a robot that moves an article. The control method includes: a predicting step of predicting contact from a position of the robot and a position of a person or an object; and an acceleration changing step of changing an acceleration of a deceleration of the robot for performing an emergency stop according to whether the article is present, when contact is predicted in the predicting step.

Effects of Invention

According to one aspect of the present invention, contact between the robot that moves the article and the operator can be avoided, and the influence on the article can be reduced.

DESCRIPTION OF EMBODIMENTS

Figure 1:
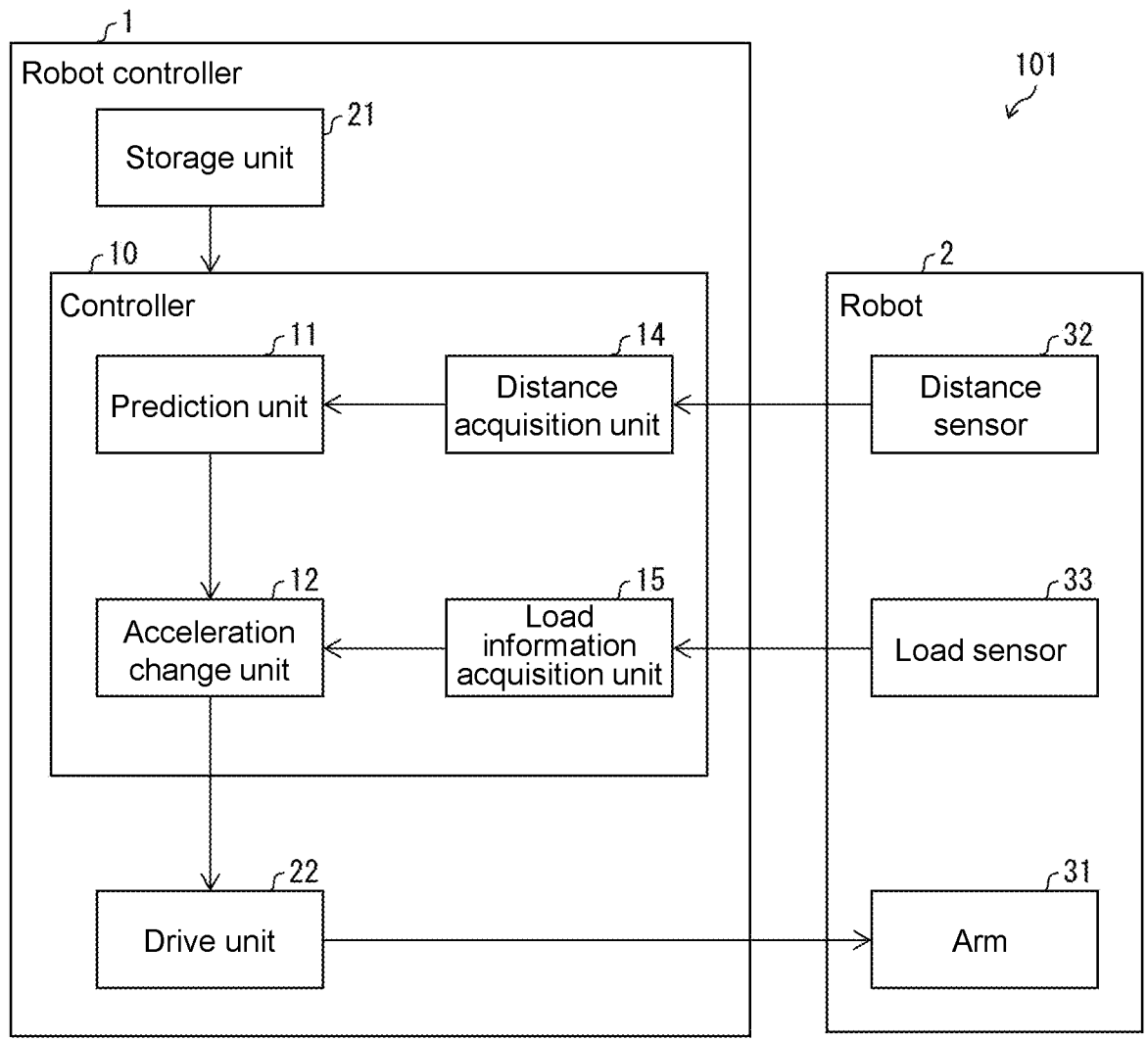
FIG. 1 is a block diagram showing a configuration of main parts of the control system according to the first embodiment.

Hereinafter, an embodiment (hereinafter also referred to as "the present embodiment") according to one aspect of the present invention will be described based on the drawings.

First Embodiment

A control system of the first embodiment will be described hereinafter. For convenience of description, members having the same functions as the members described in the first embodiment are denoted by the same reference numerals in the following embodiments, and the description thereof will not be repeated. Also, for simplification, the description of the same matters as those in the related art will be omitted as appropriate.

1. Application Example

When a robot and an operator cooperate, contact between them can be avoided by predicting the operations of the robot and an obstacle. By predicting in advance the timing of contact between them and determining the acceleration of the deceleration, the deceleration can be started so that the robot can stop by the timing of the contact.

When the robot is transporting a workpiece, there is a risk that the inertial force may damage the workpiece or contents thereof if the robot is stopped by sudden braking. Therefore, by changing the acceleration of the deceleration according to whether a workpiece is present, the risk of damaging the workpiece can be reduced.

2. Configuration Example

Figure 2:
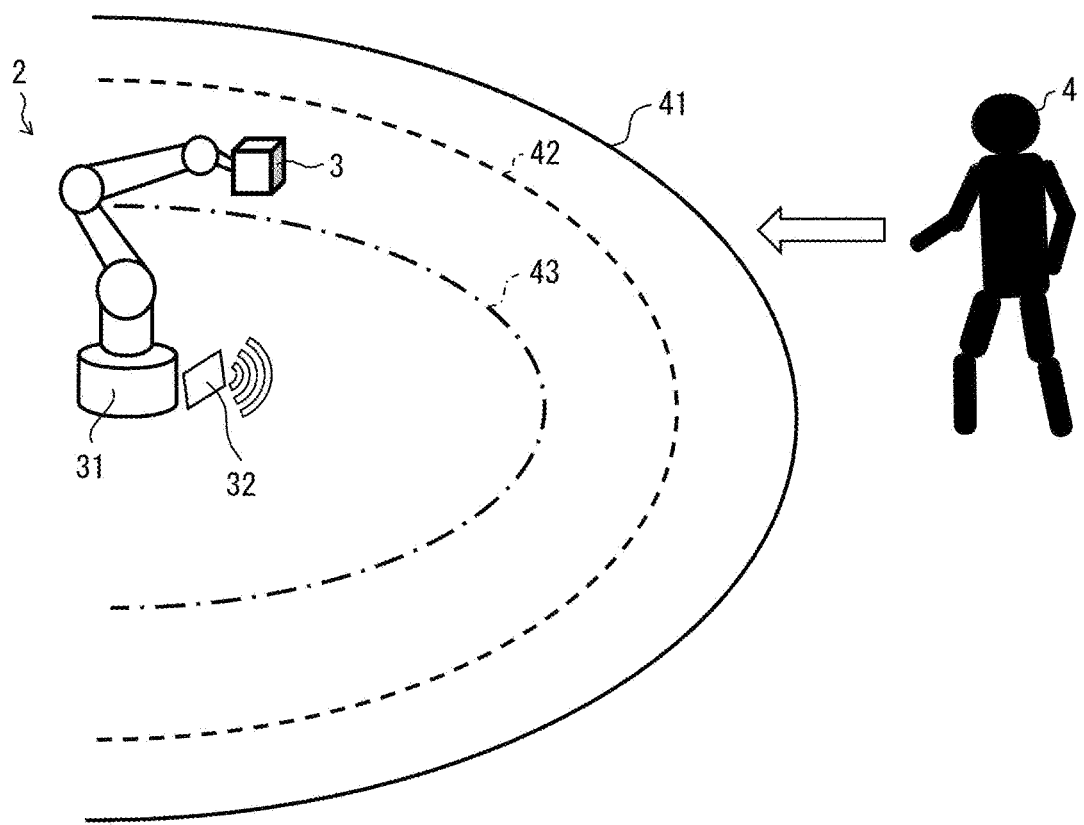
FIG. 2 is a diagram showing an overview of the positional relationship between the robot and the obstacle.

FIG. 1 is a block diagram showing a configuration of main parts of the control system 101 according to the first embodiment. FIG. 2 is a diagram showing an overview of the positional relationship between the robot and the obstacle. The control system 101 includes a robot controller 1 (control device) and a robot 2.

The robot controller 1 includes a controller 10, a storage unit 21, and a drive unit 22. The robot 2 includes an arm 31, a distance sensor 32, and a load sensor 33.

The controller 10 comprehensively controls each part of the robot controller 1. The controller 10 includes a prediction unit 11, an acceleration change unit 12, a distance acquisition unit 14, and a load information acquisition unit 15.

The arm 31 is a multi-axis (multi-joint) robot arm. The arm 31 has a gripping mechanism or a vacuum suction mechanism for a workpiece 3 (article). The robot 2 is a fixed robot that moves the workpiece 3 with the arm 31.

The distance sensor 32 is a sensor that has a function of detecting that an obstacle 4 (operator or object) is entering the movable range of the arm 31. The distance sensor 32 identifies the position of the obstacle 4 by detecting the distance between the distance sensor 32 and the obstacle 4. The distance sensor 32 transmits the acquired information on the distance between the distance sensor 32 and the obstacle 4 to the robot controller 1. That is, the distance sensor 32 transmits information on the position of the obstacle 4 to the robot controller 1. The distance sensor 32 may be a laser scanner, a camera, a light curtain, a mat switch, or the like. The information on the position of the obstacle 4 acquired by the distance sensor 32 is transmitted to the robot controller 1.

The load sensor 33 is a sensor attached to the arm 31, for example, and is a sensor that determines whether the arm 31 is gripping the workpiece 3 (article). The load sensor 33 transmits whether the workpiece 3 is present to the robot controller 1. If the arm 31 has the gripping mechanism, the load sensor 33 may be a force sensor that measures the force applied to the workpiece 3 by the gripping mechanism. If the arm 31 has the vacuum suction mechanism, the load sensor 33 may be a pressure sensor provided in a suction path. The load sensor 33 may be a proximity sensor that detects the workpiece 3, a temperature sensor that detects whether the workpiece 3 is present based on temperature, or a camera that captures an image of the workpiece 3.

The distance acquisition unit 14 acquires information on the distance between the distance sensor 32 and the obstacle 4, that is, information on the position of the obstacle 4, from the distance sensor 32 at predetermined intervals. The distance acquisition unit 14 outputs information on the position of the obstacle 4 to the prediction unit 11.

The prediction unit 11 predicts contact between the arm 31 and the obstacle 4 based on information on the position of the arm 31 and information on the position of the obstacle 4. Since the controller 10 of the robot controller 1 controls the arm 31, the controller 10 holds the information on the position of the arm 31. The prediction is to predict the state (position and speed) of the arm 31 and the obstacle 4 at a certain timing after the lapse of a certain period of time based on the state acquired so far (time history of the position of the arm 31 and the position of the obstacle 4). The prediction unit 11 outputs the prediction result to the acceleration change unit 12. For example, when the predicted result indicates that the arm 31 and the obstacle 4 are coming into contact with each other, the prediction unit 11 outputs the prediction of contact and the time of contact (contact prediction timing) to the acceleration change unit 12.

The load information acquisition unit 15 acquires information on whether the workpiece 3 being moved by the arm 31 is present and the type of the workpiece 3 from the load sensor 33. The load information acquisition unit 15 outputs the information on whether the workpiece 3 is present and the type of the workpiece 3 to the acceleration change unit 12.

The acceleration change unit 12 determines the acceleration of the arm 31 based on whether contact is predicted and the contact prediction timing. The information on whether the workpiece 3 is present and the type of the workpiece 3 acquired by the load sensor 33 is used for the determination. The acceleration change unit 12 changes (differentiates) the acceleration of the deceleration of the arm 31 for an emergency stop according to whether the workpiece 3 is present. The acceleration change unit 12 outputs the determined acceleration of the arm 31 to the drive unit 22.

The storage unit 21 is a memory in the robot controller 1 and a storage area including programs. In addition, the storage unit 21 stores parameters such as the predetermined acceleration of the deceleration during an emergency stop and the mass, shape, hardness, and temperature of the workpiece 3 for each type of workpiece 3.

The drive unit 22 actually drives the arm 31 according to the determined acceleration. In addition to a motor driver, the drive unit 22 also includes a circuit unit that creates command values for the motor driver.

In the present embodiment, the robot controller 1 controls the arm 31, but a PLC may have the functions of the robot controller 1.

3. Operation Example

In FIG. 2, a range 41 indicated by a solid line is a range where the control system detects the obstacle 4. The prediction unit 11 predicts when the obstacle 4 enters this range. There is a range 42 indicated by a broken line inside the range (obstacle detection range) 41, and in a case where the arm 31 is gripping the workpiece 3, when the obstacle 4 enters the range 42, deceleration is started. There is a range 43 indicated by a one dot chain line inside the range 42, and in a case where the arm 31 does not grip the workpiece 3, when the obstacle 4 enters the range 43, deceleration is started.

The range 42 and the range 43 are pseudo ranges for easy understanding, and in practice, the contact prediction timing is identified from the prediction result of the operation of the arm 31 and the prediction result of the operation of the obstacle 4. For example, when the obstacle 4 enters the range 41, deceleration is started at the timing when the obstacle 4 is going to enter the range 42 or the range 43 as a result of predicting the operation of the obstacle 4.

Figure 3:
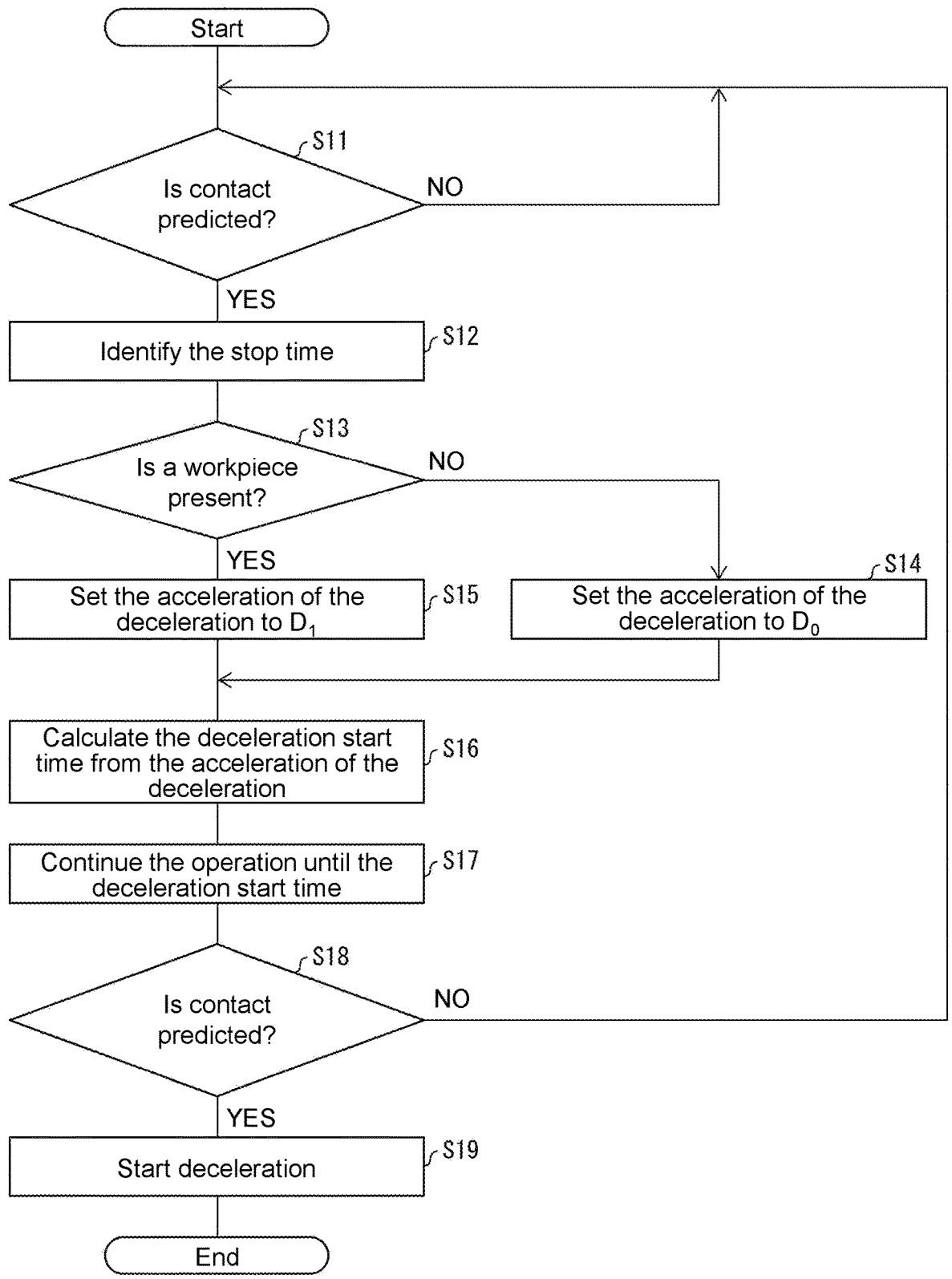
FIG. 3 is a flowchart showing an operation of the control system according to the first embodiment.
Figure 4:
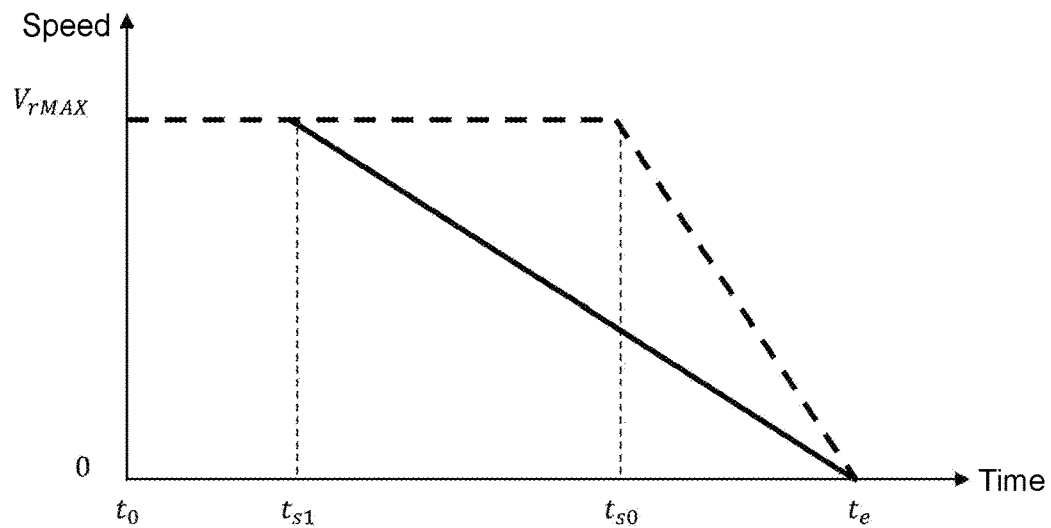
FIG. 4 is a graph showing the operation speed of the arm according to the first embodiment.

FIG. 3 is a flowchart showing an operation of the control system 101 according to the first embodiment. FIG. 4 is a graph showing an example of the operation speed of the arm 31 according to the first embodiment. In FIG. 4, the horizontal axis is time, and the vertical axis is the operation speed of the arm 31.

In S11, the distance acquisition unit 14 uses the distance sensor 32 to detect the obstacle 4 entering the obstacle detection range 41 and outputs the result to the prediction unit 11. The prediction unit 11 determines whether the arm 31 (robot 2) and the obstacle 4 are coming into contact with each other in the future. The prediction unit 11 predicts the operations of the arm 31 and the obstacle 4 based on the current situation (current positions of the arm 31 and the obstacle 4) and the past situation (history of the positions of the arm 31 and the obstacle 4 up to the present) stored in the storage unit 21. If no contact is predicted (No in S11), the processing returns to S11 and loops. If contact is predicted (Yes in S11), the processing proceeds to S12. In addition, the current time is to, which is the processing start timing.

In S12, the prediction unit 11 obtains a stop timing $t_e$ (stop time) when the arm 31 should be stopped to avoid contact. The stop timing $t_e$ is identified by the prediction unit 11 as the timing immediately before the obstacle 4 enters the movable range of the arm 31 and the workpiece 3 with a safe distance added. In identifying the stop timing, a risk assessment is performed as a system including the arm 31 and the obstacle 4, and the prediction unit 11 predicts in consideration of the result thereof.

In S13, the load information acquisition unit 15 uses the load sensor 33 to determine whether there is a workpiece 3 gripped by the arm 31 and outputs the determined result to the acceleration change unit 12. If there is no workpiece 3 (No in S13), the processing proceeds to S14, and the acceleration change unit 12 sets the acceleration of the deceleration for an emergency stop of the arm 31 to Do. If the workpiece 3 is present (Yes in S13), the processing proceeds to S15, and the acceleration change unit 12 sets the acceleration of the deceleration for an emergency stop of the arm 31 to $D_1$. Here, there is a relationship of $|D_1|<|D_0|$, and the deceleration is set to have a greater acceleration when the workpiece 3 is not gripped. The directions (signs) of the acceleration of the deceleration are the same for $D_1$ and $D_0$, and the magnitude relationship between the absolute values of the accelerations is described here. The accelerations $D_1$ and $D_0$ act in the direction to stop the arm 31.

The acceleration $D_0$ of the deceleration when no workpiece 3 is present may be the maximum acceleration of the deceleration, which is the acceleration of the deceleration for an emergency stop of the arm 31. In contrast, the acceleration $D_1$ of the deceleration when the workpiece 3 is present is the acceleration of the deceleration set in advance so as not to damage the workpiece 3. In this way, the acceleration change unit 12 changes the acceleration of the deceleration of the arm 31 for an emergency stop to a different one according to whether the workpiece 3 is present.

In S16, as shown in FIG. 4, the acceleration change unit 12 calculates the deceleration start timing $t_{s0}$ or $t_{s1}$ using the identified acceleration $D_0$ or $D_1$ of the deceleration and the stop timing $t_e$. Here, $t_{s0}$ is the deceleration start timing when no workpiece 3 is present, and $t_{s1}$ is the deceleration start timing when the workpiece 3 is present. When the workpiece 3 is present, the absolute value of the acceleration of the deceleration is smaller, so the time required to stop becomes longer. Therefore, when the workpiece 3 is present, the acceleration change unit 12 starts deceleration at an earlier deceleration start timing than when no workpiece 3 is present.

The deceleration start timing may be calculated based on the maximum speed $V_{rMAX}$ instead of based on the current operation speed of the arm 31. This is a consideration for safety so that the arm 31 can be decelerated and stopped even at the maximum speed higher than the current operation speed.

In S17, the operation of the arm 31 is continued until the deceleration start timing $t_{s0}$ or $t_{s1}$.

In S18, the prediction unit 11 again determines whether the arm 31 and the obstacle 4 are coming into contact with each other in the future by $t_{s0}$ or $t_{s1}$ which is the deceleration start timing according to whether the workpiece 3 is present. This is because the moving speed or moving direction of the obstacle 4 may have changed. As a result, if no contact is predicted (No in S18), the processing is continued without returning to S11 and stopping the arm 31 in an emergency. On the other hand, if contact is predicted (Yes in S18), the processing proceeds to S19.

In S19, at $t_{s0}$ or $t_{s1}$ which is the deceleration start timing according to whether the workpiece 3 is present, the acceleration change unit 12 starts deceleration for an emergency stop of the arm 31 at the acceleration $D_1$ or $D_0$ of the deceleration corresponding to whether the workpiece 3 is present. As for the actual deceleration operation, the drive unit 22 decelerates the arm 31 according to the command value of the acceleration change unit 12 and stops the arm 31. For example, after the deceleration starts, the arm 31 is decelerated and stopped even if the moving speed of the obstacle 4 changes and it is predicted that the obstacle 4 is not coming into contact with the arm 31.

The processing of S13 to S15 may be performed before S11.

4. Function and Effect

In the control system 101 of the present embodiment, when contact between the robot 2 and the obstacle 4 is predicted, the prediction unit 11 calculates the stop timing $t_e$ at which the arm 31 can stop by ensuring a safe distance. Then, deceleration can be started from the deceleration start timing $t_{s0}$ or $t_{s1}$ so that the arm 31 can stop at the stop timing $t_e$ even if the arm 31 is operating at the maximum speed $V_{rMAX}$.

Further, in the control system 101 of the present embodiment, the acceleration of the deceleration can be changed according to whether the workpiece 3 is present. The deceleration start timing is changed according to whether the workpiece 3 is present. When the workpiece 3 is present, the force acting on the workpiece 3 is reduced by reducing the absolute value of the acceleration of the deceleration for an emergency stop. Therefore, it is possible to reduce the influence on the workpiece 3 due to the deceleration of the emergency stop, and to prevent the workpiece 3 from being damaged by the inertial force during deceleration. When calculating the deceleration start timing, it is possible to safely stop the robot by considering the case where the robot decelerates from the maximum speed.

In addition, even in a case where it is predicted that the obstacle 4 will contact at any time, if the situation changes before the deceleration start timing $t_{s0}$ or $t_{s1}$ and the prediction changes that the obstacle 4 will not contact, the robot 2 can continue to operate. Therefore, in the control system 101 of the present embodiment, the obstacle 4 and the arm 31 can ensure a safe distance without decelerating until immediately before the contact, thereby improving productivity. Further, when no workpiece 3 is present, the deceleration start timing is set later than when the workpiece 3 is present. As a result, the robot 2 can continue the work as much as possible according to whether the workpiece 3 is present, and productivity can be improved.

Second Embodiment

Other embodiments of the present invention will be described hereinafter.

Figure 5:
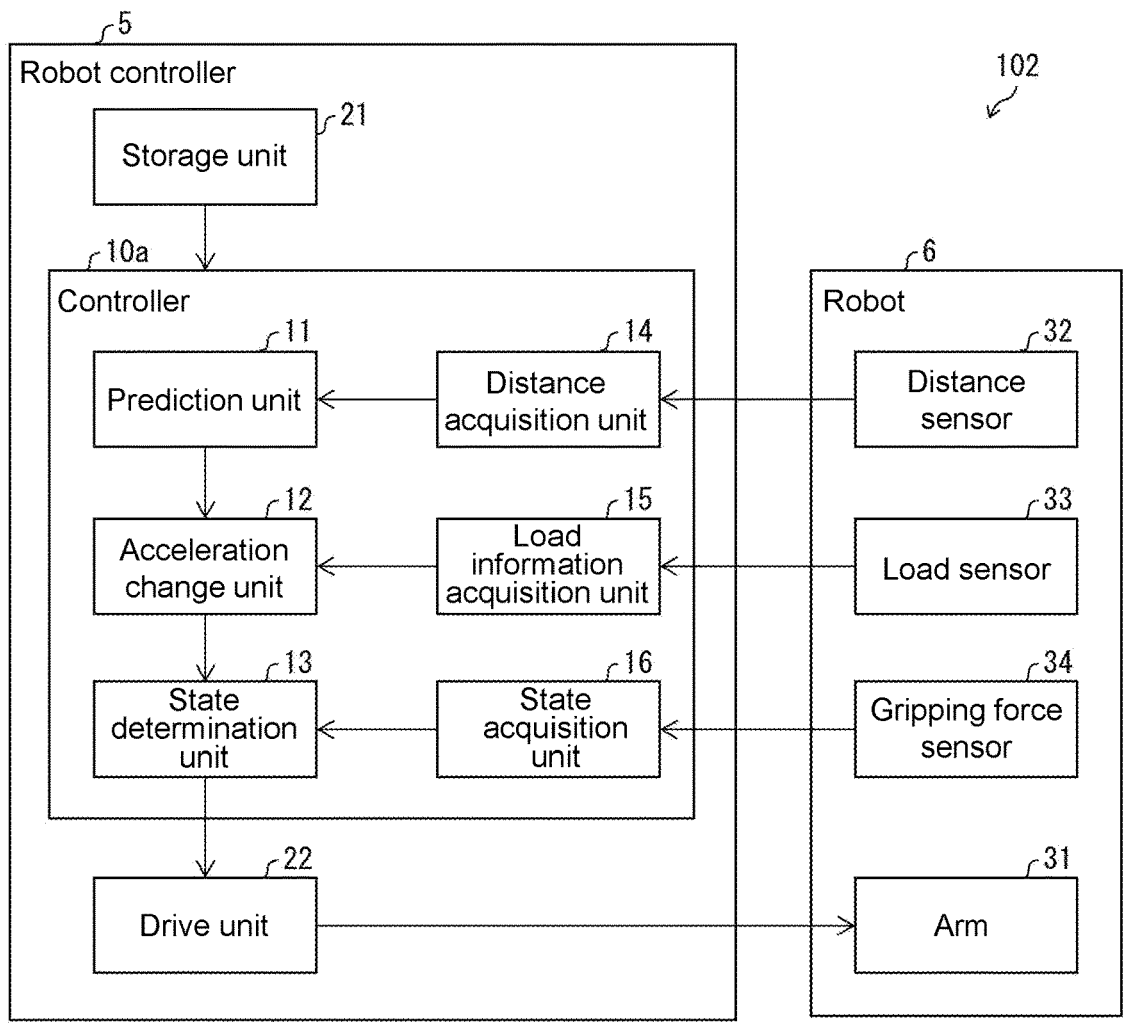
FIG. 5 is a block diagram showing a configuration of main parts of the control system according to the second embodiment.

FIG. 5 is a block diagram showing a configuration of main parts of a control system 102 according to the second embodiment. The control system 102 includes a robot controller 5 and a robot 6.

The robot controller 5 is different from the robot controller 1 in that the robot controller includes a controller 10a instead of the controller 10. The controller 10a differs from the controller 10 in that, in addition to the configuration of the controller 10, the controller 10a includes a state determination unit 13 and a state acquisition unit 16. The robot 6 differs from the robot 2 in that, in addition to the configuration of the robot 2, the robot 6 includes a gripping force sensor 34.

The gripping force sensor 34 is a sensor that indicates a held state of the workpiece 3 held by the arm 31. For example, when the arm 31 (the end effector at the tip thereof) sandwiches the workpiece 3, the gripping force sensor 34 may be a load cell, and when the arm 31 vacuum-sucks the workpiece 3, the gripping force sensor 34 may be a pressure sensor. The gripping force sensor 34 is not limited to these, and any sensor that detects the held state of the workpiece 3 may be used. The held state is an index indicating how well the workpiece 3 is held, such as whether the workpiece 3 is firmly held or whether there is a possibility that the workpiece 3 may be dropped. For example, in the case of vacuum suction, the held state is good if the pressure in the suction path is lower than a predetermined value (that is, if the suction pressure (negative pressure) is greater than a predetermined value). In the case where the workpiece 3 is sandwiched, the held state is good if the gripping force is greater than a predetermined value. Further, if the difference between the maximum value and the minimum value of the gripping force in a predetermined period is greater than a predetermined value, indicating that the workpiece 3 is vibrating, the held state is bad.

The state acquisition unit 16 uses the gripping force sensor 34 to acquire the held state (sensor value) of the workpiece 3. The state acquisition unit 16 outputs the acquired held state to the state determination unit 13.

The state determination unit 13 has a function of adjusting the acceleration of the deceleration of the arm 31 during an emergency stop based on the held state acquired by the state acquisition unit 16. The state determination unit 13 acquires the acceleration of the deceleration of the arm 31 from the acceleration change unit 12. The state determination unit 13 changes the acceleration of the arm 31 adjusted by the acceleration change unit 12 according to the held state of the workpiece 3. Specifically, when the held state is bad, the absolute value of the acceleration of the deceleration is reduced so as not to drop the workpiece 3.

Figure 6:
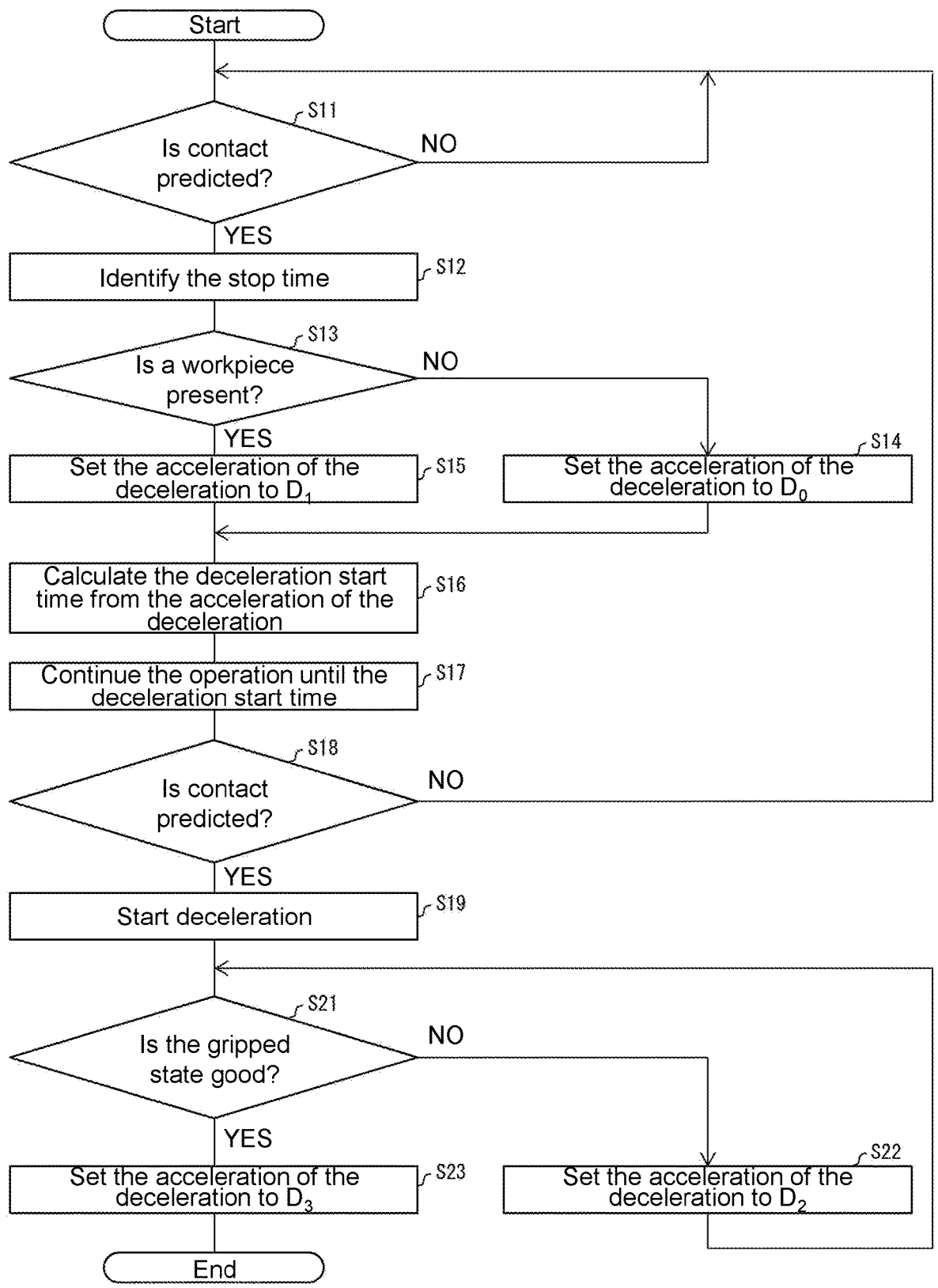
FIG. 6 is a flowchart showing an operation of the control system according to the second embodiment.
Figure 7:
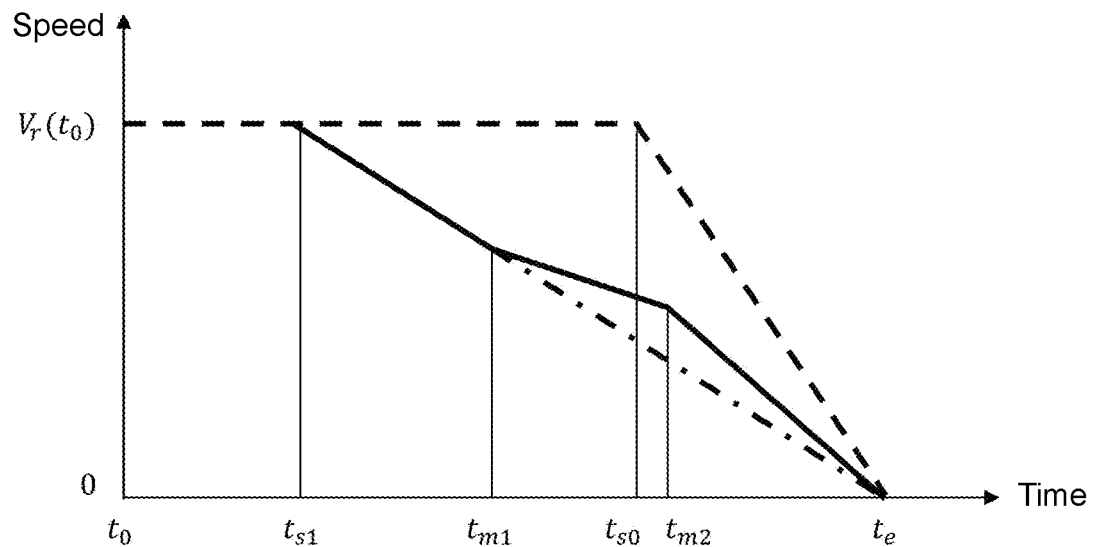
FIG. 7 is a graph showing the operation speed of the arm when the held state deteriorates and then improves according to the second embodiment.
Figure 8:
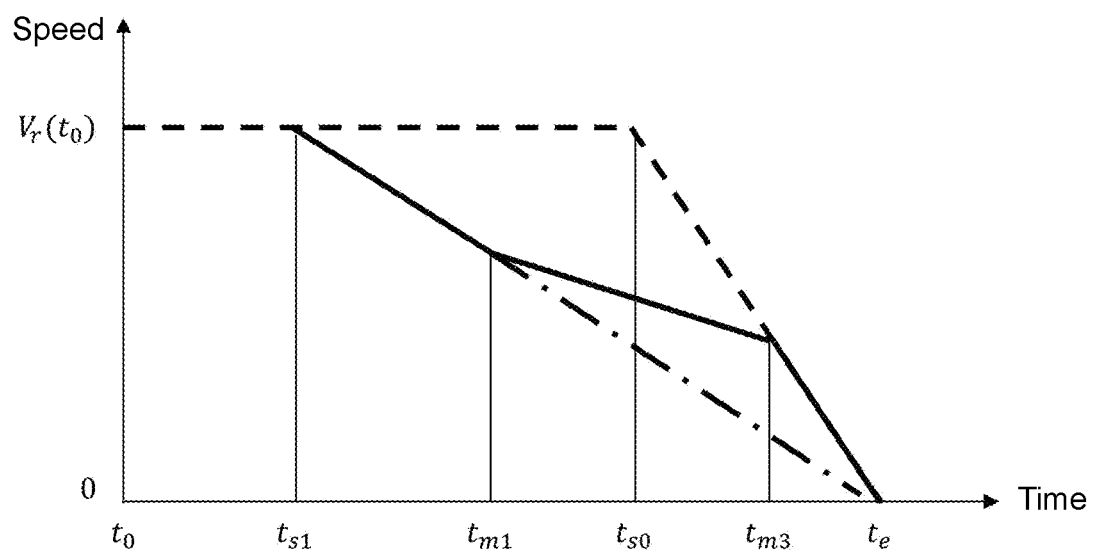
FIG. 8 is a graph showing the operation speed of the arm when decelerating while the held state deteriorates according to the second embodiment.

FIG. 6 is a flowchart showing an operation of the control system 102 according to the second embodiment. FIG. 7 is a graph showing the operation speed of the arm 31 when the held state deteriorates and then improves according to the second embodiment. FIG. 8 is a graph showing the operation speed of the arm 31 when decelerating while the held state deteriorates according to the second embodiment. In FIG. 7 and FIG. 8, the horizontal axis is time, and the vertical axis is the operation speed of the arm 31. In the present embodiment, the acceleration change unit 12 does not raise the operation speed of the arm 31 above the speed $V_r(t_0)$ of time $t_0$ when contact is predicted. The stop start timings $L_{s1}$ and $t_{s0}$ are determined on the assumption that the arm 31 continues to operate at the speed $V_r(t_0)$ of time $t_0$ instead of the maximum speed $V_{rMAX}$.

In FIG. 6, S11 to S19 are the same as in FIG. 3, but in FIG. 6, processes S21 to S23 are added after S19.

In S21, the held state is acquired by the state acquisition unit 16 using the gripping force sensor 34 and output to the state determination unit 13. The state determination unit 13 determines the held state of the workpiece 3 based on the acquired held state. If the held state is bad (No in S21), the processing proceeds to S22, and if the held state is good (Yes in S21), the processing proceeds to S23.

In S22 (if the held state is bad), the state determination unit 13 adjusts the acceleration of the deceleration to reduce the acceleration to the acceleration $D_2$ of the deceleration that matches the held state. That is $|D_2|<|D_1|$. That is, the state determination unit 13 reduces the absolute value of the acceleration of the deceleration during deceleration of the arm 31 for an emergency stop. After S22, the processing returns to S21 to determine the held state again.

In S23 (if the held state is good), the state determination unit 13 determines whether the arm 31 can be stopped by the stop timing $t_e$, and increases the absolute value of the acceleration to the acceleration $D_3$ of the deceleration at which the arm 31 can be stopped. That is $|D_3|>|D_1|$. However, if the arm 31 can be stopped by the stop timing $t_e$ at the acceleration $D_1$ of the deceleration, it may be set that $|D_3|=|D_1|$.

In other words, if the held state is bad, the state determination unit 13 reduces the acceleration of the deceleration to weaken the inertial force, but if this state is maintained, the arm 31 cannot be stopped at the stop timing $t_e$. Therefore, at the time when the held state has improved, the state determination unit 13 increases the acceleration of the deceleration and adjusts so that the arm 31 can be stopped at the stop timing $t_e$.

In FIG. 7, when the workpiece 3 is present (solid line in FIG. 7), the arm 31 decelerates at the acceleration $D_1$ of the deceleration from time $t_0$ to time $t_{m1}$, and the held state is good during this period. Since the held state deteriorates at time $t_{m1}$, the acceleration of the deceleration is reduced to $D_2$ at time $t_{m1}$ to weaken the inertial force. As a result, at time $t_{m2}$, the held state of the workpiece 3 improves and the workpiece 3 can be stably gripped. Therefore, the acceleration of the deceleration is increased to $D_3$ from time $t_{m2}$ to time $t_e$ so that the arm 31 can be stopped at the stop timing $t_e$. Here, the acceleration of the deceleration has a relationship of $|D_0| \geq |D_3| > |D_1| > |D_2|$.

Further, in FIG. 8, it is shown that, when the workpiece 3 is present (solid line in FIG. 8), the held state deteriorates at time $t_{m1}$, so the acceleration of the deceleration is reduced to $D_2$ at time $t_{m1}$, but the held state does not improve. If the held state has not improved, even at time $t_{m3}$ at which the deceleration curve (broken line in FIG. 8) when no workpiece 3 is present is reached, once the held state deteriorates, the arm 31 decelerates at the maximum acceleration $D_0$ of the deceleration from time $t_{m3}$ to time $t_e$ and stops by the stop timing $t_e$. This is because the safety of the obstacle 4 is prioritized over the damage of the workpiece 3, and the emergency stop operation is performed. Here, the acceleration of the deceleration has a relationship of $|D_0|>|D_1|>|D_2|$.

Therefore, the acceleration of the deceleration is adjusted according to the held state to weaken the inertial force, and the arm 31 can be decelerated and stopped without damaging the workpiece 3. In addition, if the current acceleration of the deceleration is too small to stop at the stop timing, the maximum acceleration of the deceleration in the emergency stop operation can be used to avoid contact with the obstacle.

The processing may return to S21 again after S23. The increase or decrease in acceleration of the deceleration may be repeatedly adjusted according to the held state. However, as described above, the deceleration curve should not exceed the deceleration curve (broken line in FIG. 8) when no workpiece 3 is present to the right.

First Modified Example

A plurality of load sensors 33 may be provided. In addition, the type of workpiece 3 may be determined by the load sensor 33. The acceleration change unit 12 may set a different acceleration of the deceleration for each type of workpiece 3. For example, if the mass of the workpiece 3 is large, the acceleration of the deceleration may be reduced. For example, if the strength of the workpiece 3 is low, the acceleration of the deceleration may be reduced. In addition, the acceleration of the deceleration may be further reduced for the workpiece 3 that is difficult to grip. As a result, the acceleration of the deceleration can be set for each type of workpiece 3 for preventing dropping or damage while maintaining productivity as high as possible.

Second Modified Example

Figure 9:
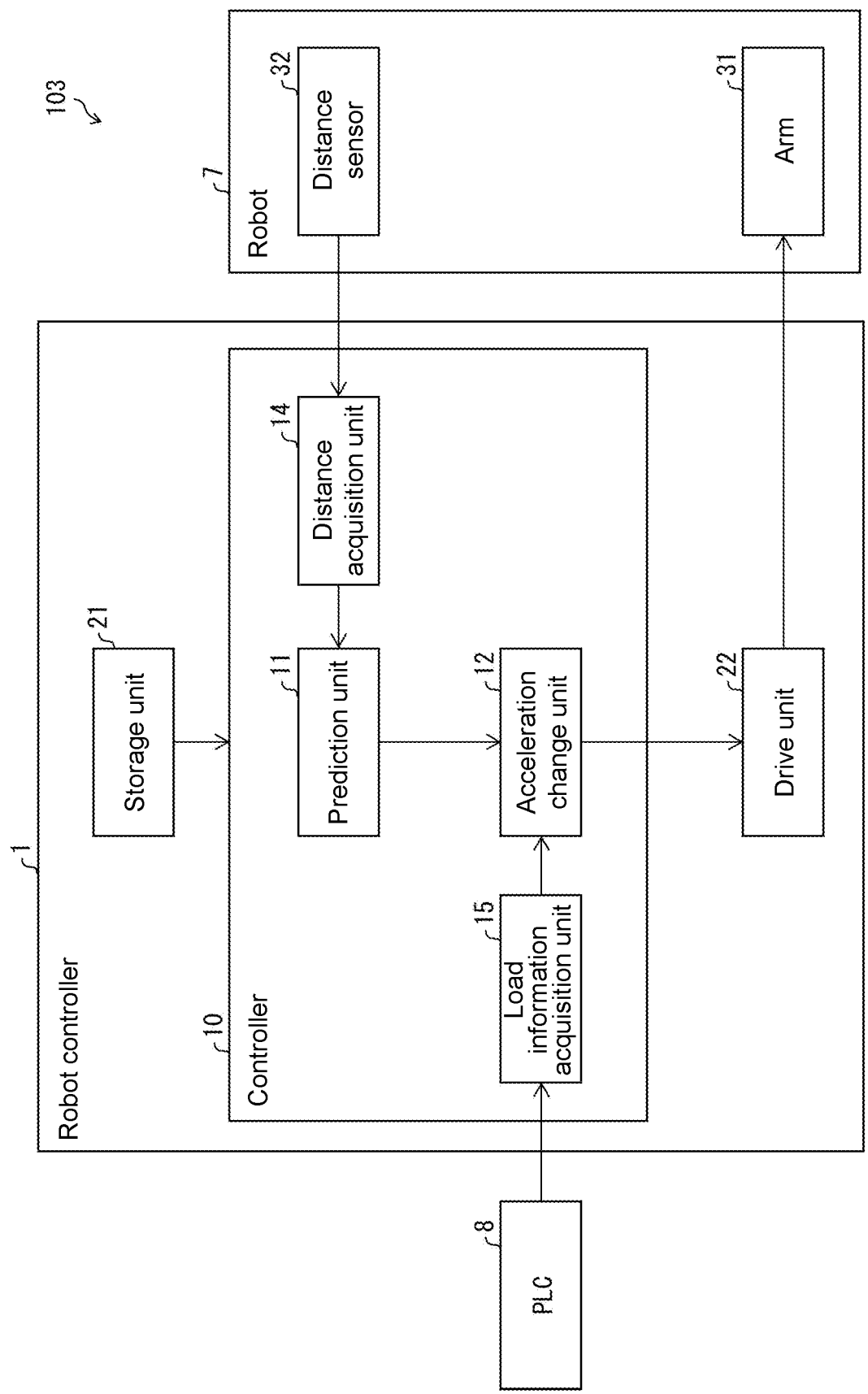
FIG. 9 is a block diagram showing a configuration of main parts of the control system according to a modified example.

FIG. 9 is a block diagram showing a configuration of main parts of a control system 103 according to the second modified example. The control system 103 includes a robot controller 1, a robot 7, and a PLC 8 (programmable logic controller). The robot 7 differs from the robot 2 in that the load sensor 33 may be omitted.

The PLC 8 is a host device of the robot controller 1 in the control system 103 and has a function of managing the state of the control system 103. The PLC 8 has information as to whether the robot 7 is currently gripping the workpiece 3 (whether the robot 7 is caused to grip). The PLC 8 may notify the load information acquisition unit 15 of the robot controller 1, instead of the load sensor 33, of whether the workpiece 3 is present or the workpiece type.

The configuration has an advantage that the robot controller 1 can operate according to the notification from the PLC 8, which is a host device, which facilitates cooperation with other systems.

Third Modified Example

As described above, when the prediction unit 11 predicts contact between the obstacle 4 and the arm 31, the acceleration change unit 12 may control so as not to raise the operation speed of the arm 31. This control enables the arm 31 to stop by the stop timing.

Furthermore, the prediction unit 11 may raise the operation speed of the arm 31 before the stop start timing after predicting contact between the obstacle 4 and the arm 31. When the operation speed of the arm 31 increases, the prediction unit 11 may predict contact again. By performing prediction again, it is possible to avoid a situation that the arm 31 does not stop in time and makes contact.

Fourth Modified Example

The robot controller may be applied to control a robot such as an AGV (Automatic Guided Vehicle) or a mobile robot, instead of the robot 2 with a multi-axis arm. That is, the acceleration of the deceleration of the AGV or mobile robot that transports a workpiece at the time of an emergency stop may be changed according to whether the workpiece that is to be transported (moved) is present.

[Example of Implementation by Software]

The control blocks of the robot controllers 1 and 5 (particularly, the controller 10, the prediction unit 11, the acceleration change unit 12, the state determination unit 13, the distance acquisition unit 14, the load information acquisition unit 15, and the state acquisition unit 16) may be implemented by a logic circuit (hardware) formed in an integrated circuit (IC chip) or the like, or may be implemented by software.

In the latter case, the robot controllers 1 and 5 are equipped with a computer that executes instructions of a program, which is software for implementing each function. This computer includes, for example, one or more processors and a computer-readable recording medium storing the program. Then, in the computer, the processor reads the program from the recording medium and executes the program, thereby achieving the object of the present invention. As the processor, for example, a CPU (Central Processing Unit) can be used. As the recording medium, for example, a "non-transitory tangible medium" can be used, such as a tape, a disk, a card, a semiconductor memory, and a programmable logic circuit, in addition to a ROM (Read Only Memory). In addition, a RAM (Random Access Memory) may be further provided for developing the program. Besides, the program may be supplied to the computer via any transmission medium (communication network, broadcast wave, etc.) that is capable of transmitting the program. One aspect of the present invention can also be implemented in the form of a data signal embedded in a carrier wave in which the program is embodied by electronic transmission.

[Summary]

A control device according to one aspect of the present invention is a control device for controlling an operation speed of a robot that moves an article. The control device includes: a prediction unit predicting contact from a position of the robot and a position of a person or an object; and an acceleration change unit changing an acceleration of a deceleration of the robot for performing an emergency stop according to whether the article is present, when contact is predicted by the prediction unit.

According to the above configuration, since the acceleration of the deceleration is changed according to whether the article is present, it is possible to reduce the influence of the emergency stop on the article.

The acceleration change unit may set the acceleration of the deceleration smaller when the article is present than when the article is absent.

According to the above configuration, the acceleration of the deceleration can be reduced when the article is present, and the risk of dropping or damaging the article due to the inertial force, for example, can be reduced.

The acceleration change unit may set a deceleration start timing earlier when the article is present than when the article is absent.

According to the above configuration, the work can be continued as much as possible according to whether the article is present, thereby improving productivity.

The acceleration change unit may change the acceleration of the deceleration of the robot for performing the emergency stop according to a type of the article.

According to the above configuration, the acceleration of the deceleration can be changed according to the type of the article. Therefore, the inertial force can be adjusted according to the article (mass, strength, etc.), and the risk of dropping or damaging the article can be reduced.

The acceleration change unit may reduce the acceleration of the deceleration during deceleration of the robot for performing the emergency stop according to a held state of the article.

According to the above configuration, if the held state is bad, the article can be prevented from falling off by reducing the acceleration of the deceleration to reduce the inertial force.

After reducing the acceleration of the deceleration according to the held state of the article, the acceleration change unit may increase the acceleration of the deceleration so as to stop the robot by a stop timing for stopping the robot to avoid contact.

According to the above configuration, even if the acceleration of the deceleration is reduced once, by increasing the acceleration of the deceleration afterward, it is possible to control the robot to stop by the stop timing at the latest.

The acceleration change unit may determine the deceleration start timing of the robot on an assumption that the robot decelerates from a maximum speed of the robot.

According to the above configuration, since the calculation is based on the maximum speed of the robot, it is possible to determine the deceleration start timing at which the robot can be stopped in any situation.

The acceleration change unit may not raise the operation speed from a current operation speed of the robot when contact is predicted by the prediction unit.

According to the above configuration, after predicting contact by the prediction unit, a speed profile that raises the operation speed can be prohibited, and the robot can stop by the stop timing by decelerating from the planned deceleration start timing.

A control method according to one aspect of the present invention is a control method for controlling an operation speed of a robot that moves an article. The control method includes: a predicting step of predicting contact from a position of the robot and a position of a person or an object; and an acceleration changing step of changing an acceleration of a deceleration of the robot for performing an emergency stop according to whether the article is present, when contact is predicted in the predicting step.

The control device according to each aspect of the present invention may be realized by a computer, and in this case, a prediction program, an acceleration change program, and a computer-readable recording medium recording it for the control device, which realizes the control device in the computer by operating the computer as each part (software element) provided in the control device are also included in the scope of the present invention.

[Additional Notes]

The present invention is not limited to the embodiments described above, and various modifications are possible within the scope indicated by the claims. Embodiments obtained by appropriately combining technical means respectively disclosed in different embodiments are also included in the technical scope of the present invention.

What is claimed is:

1. A control device for controlling an operation speed of a robot that moves an article, the control device comprising:
   a prediction unit predicting contact from a position of the robot and a position of a person or an object; and
   an acceleration change unit changing an acceleration of a deceleration of the robot for performing an emergency stop according to whether the article is gripped by the robot, when contact is predicted by the prediction unit,
   the acceleration change unit sets a deceleration start timing earlier when the article is present than when the article is absent.

2. The control device according to claim 1, wherein the acceleration change unit sets the acceleration of the deceleration smaller when the article is present than when the article is absent.

3. The control device according to claim 1, wherein the acceleration change unit changes the acceleration of the deceleration of the robot for performing the emergency stop according to a type of the article.

4. The control device according to claim 1, wherein the acceleration change unit reduces the acceleration of the deceleration during deceleration of the robot for performing the emergency stop according to a held state of the article.

5. The control device according to claim 4, wherein after reducing the acceleration of the deceleration according to the held state of the article, the acceleration change unit increases the acceleration of the deceleration so as to stop the robot by a stop timing for stopping the robot to avoid contact.

6. The control device according to claim 1, wherein the acceleration change unit determines the deceleration start timing of the robot on an assumption that the robot decelerates from a maximum speed of the robot.

7. The control device according to claim 1, wherein the acceleration change unit does not raise the operation speed from a current operation speed of the robot when contact is predicted by the prediction unit.

8. A control method for controlling an operation speed of a robot that moves an article, the control method comprising:
   a predicting step of predicting contact from a position of the robot and a position of a person or an object; and
   an acceleration changing step of changing an acceleration of a deceleration of the robot for performing an emergency stop according to whether the article is gripped by the robot, when contact is predicted in the predicting step,
   in the acceleration changing step, setting a deceleration start timing earlier when the article is present than when the article is absent.

* * * * *